Patented Nov. 17, 1925.

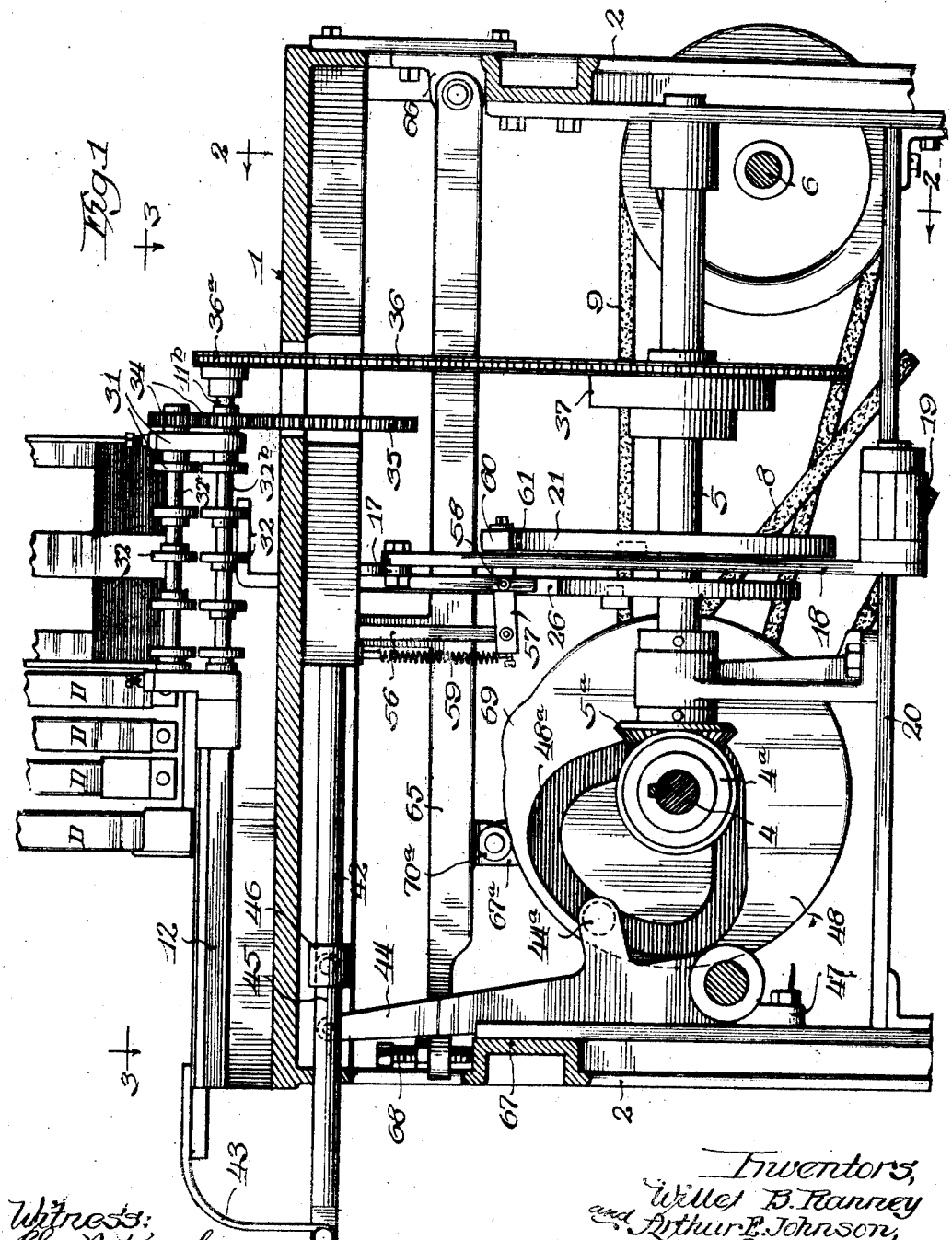

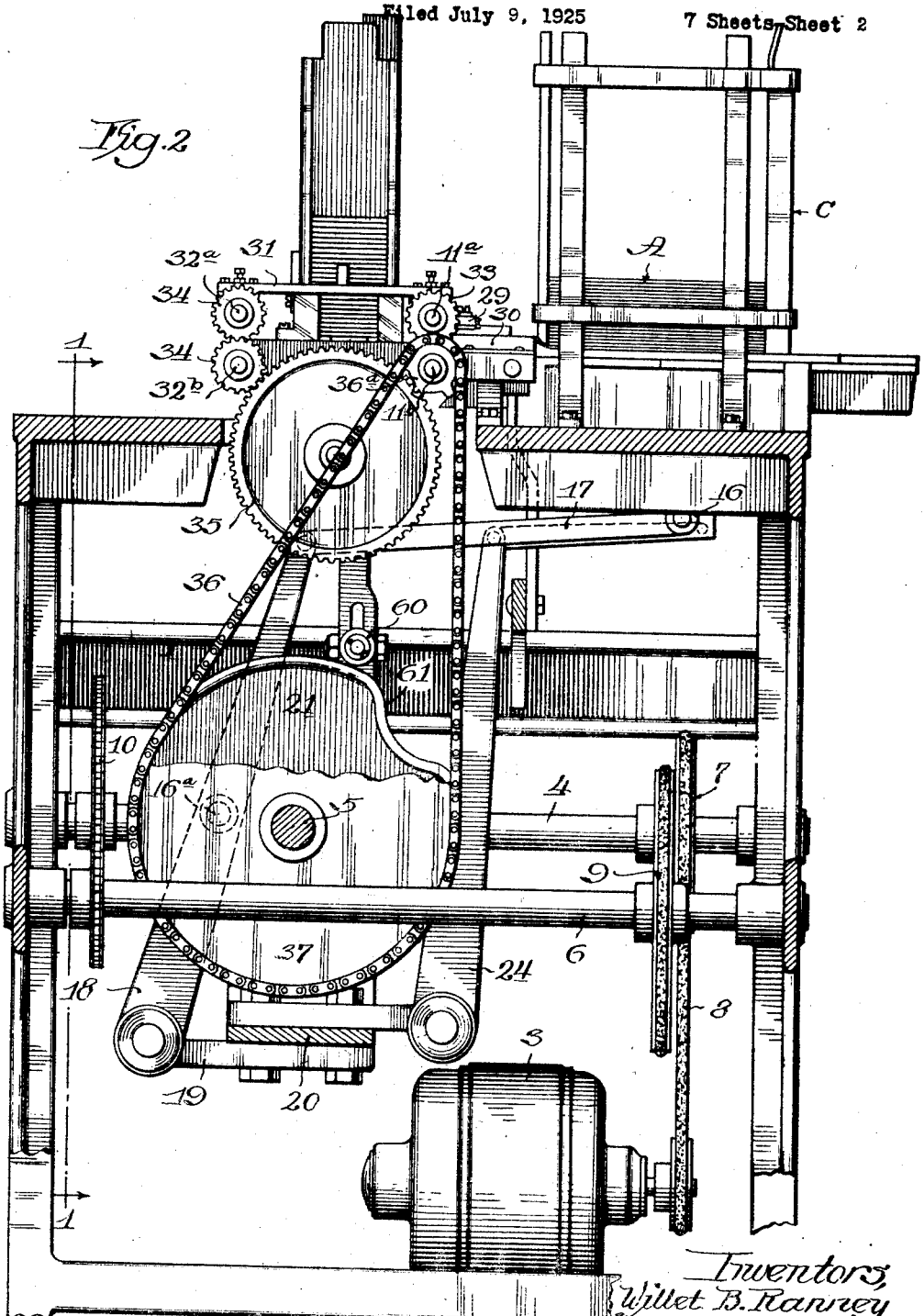

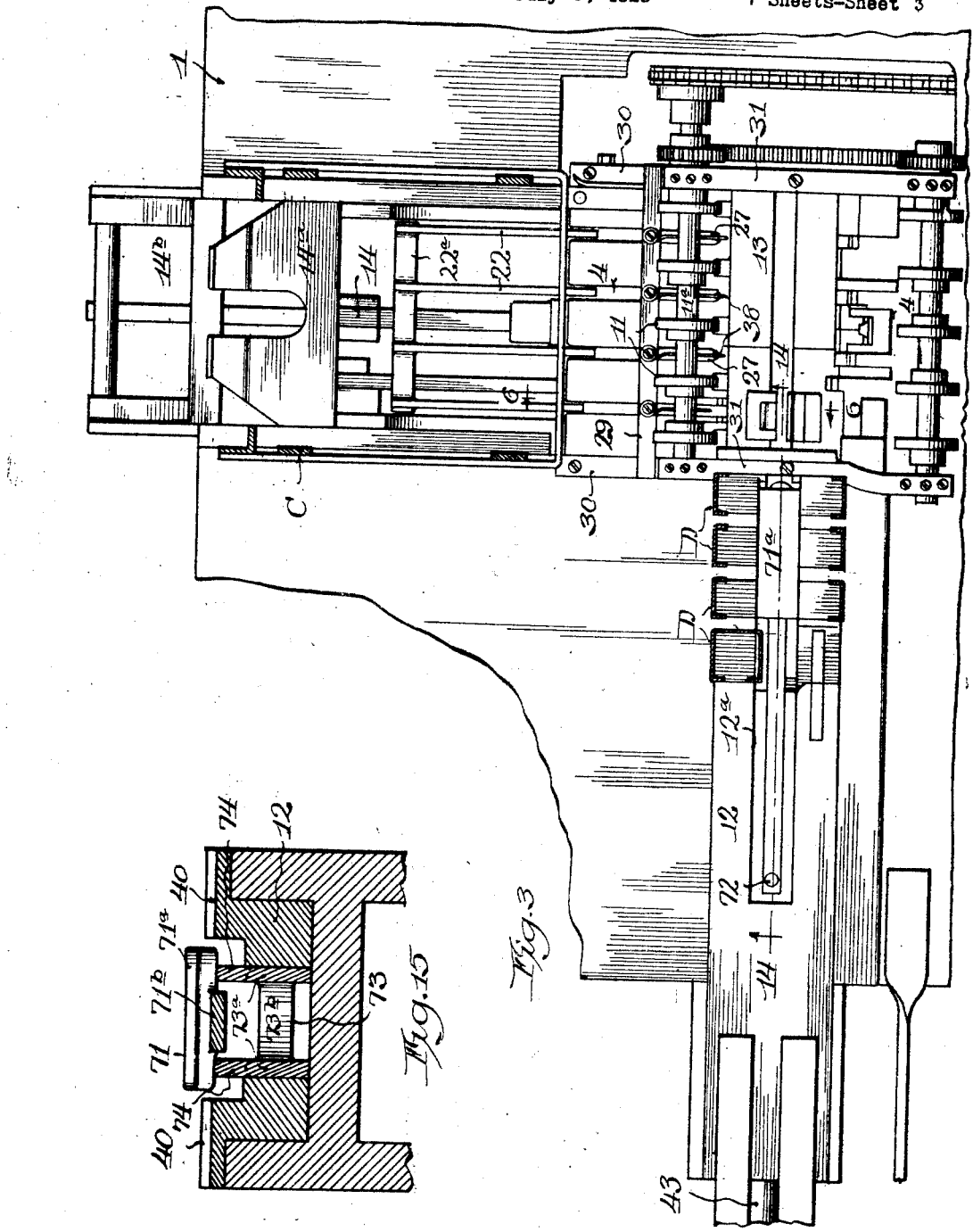

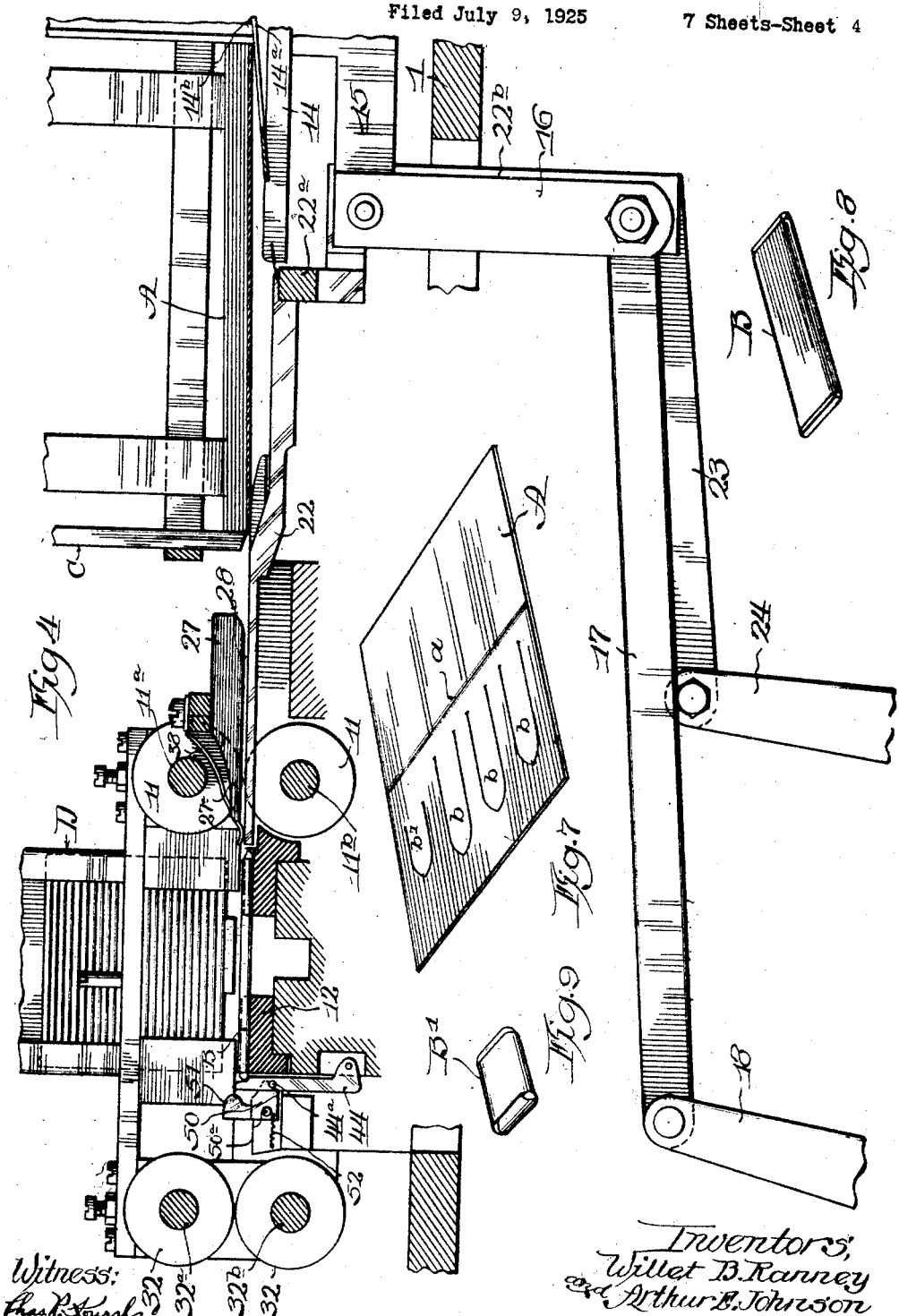

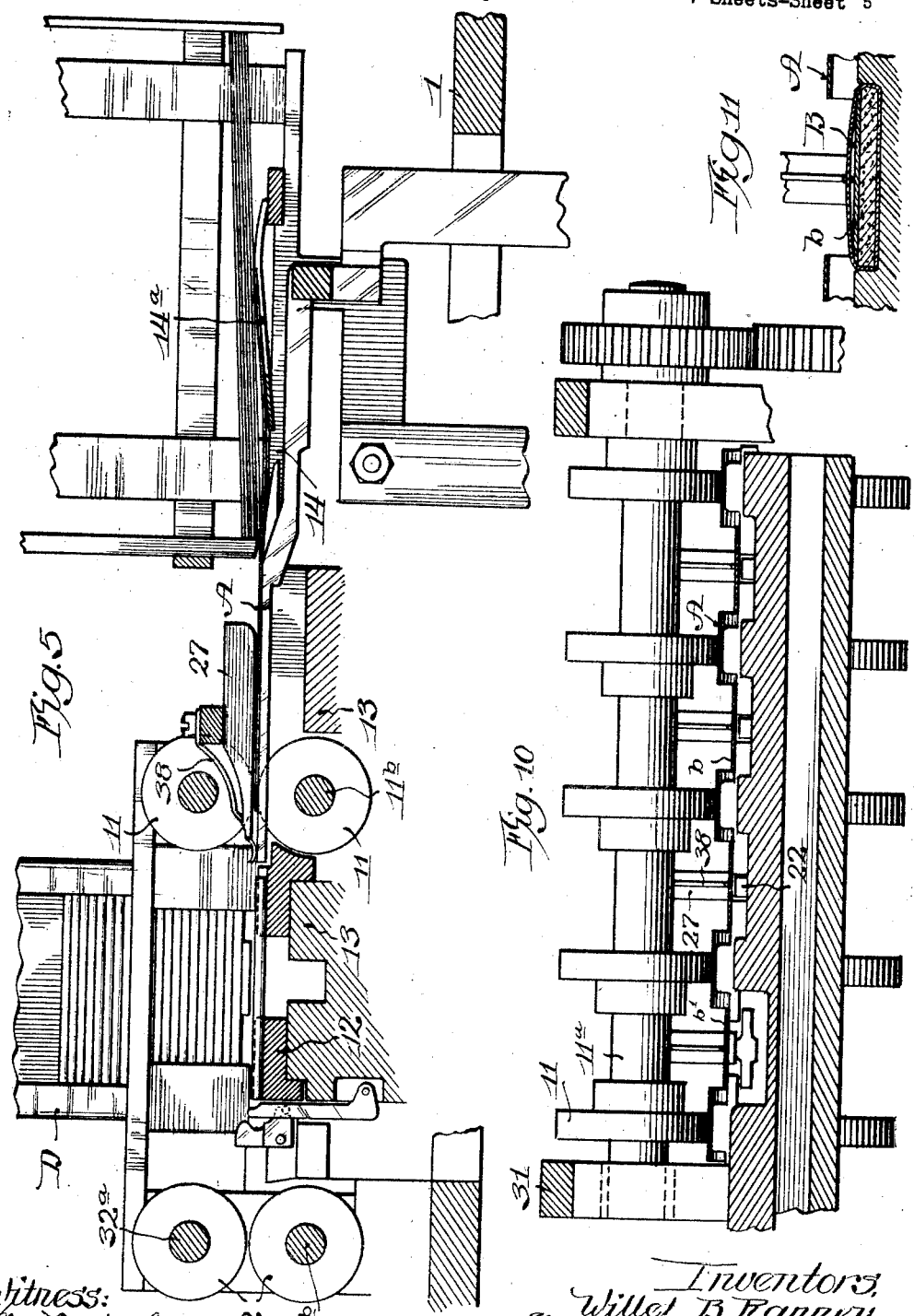

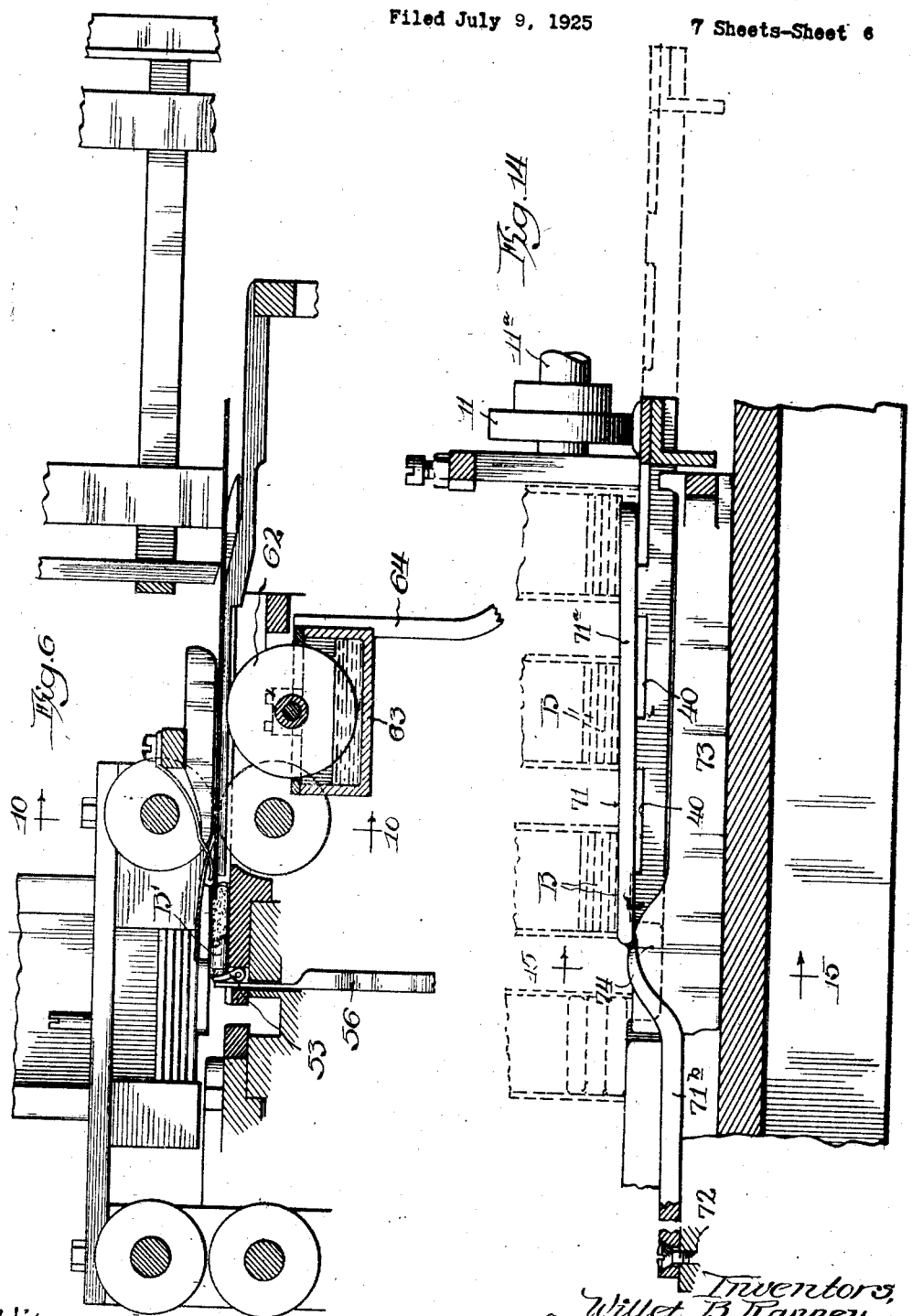

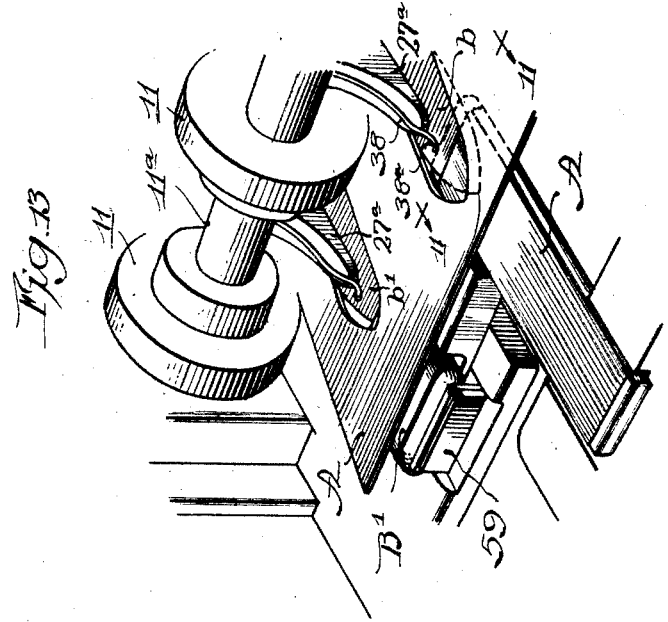
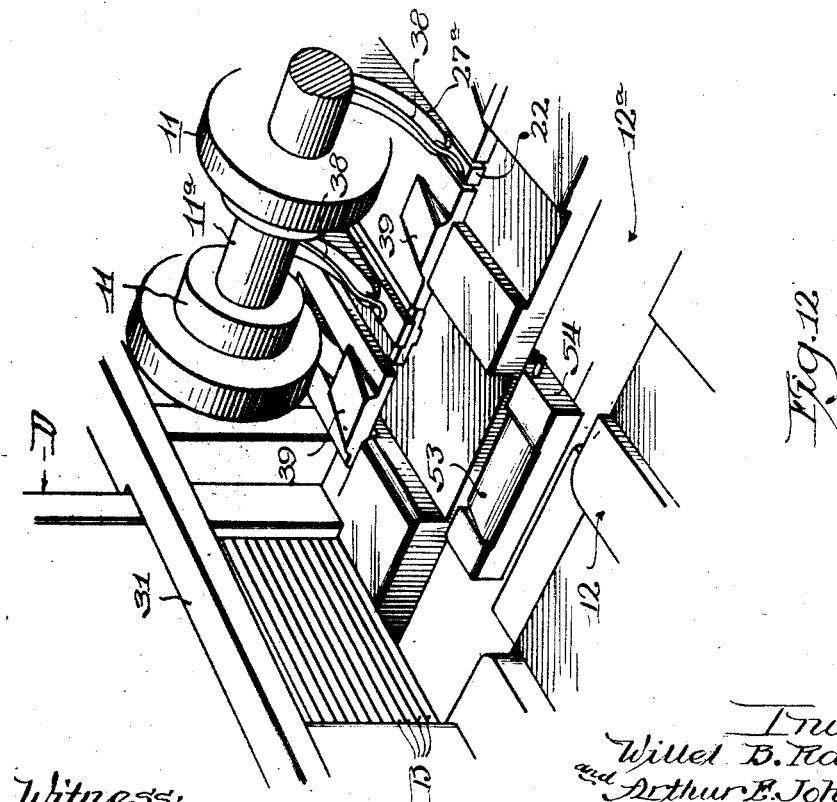

1,561,743

UNITED STATES PATENT OFFICE.

WILLET B. RANNEY, OF CHICAGO, AND ARTHUR E. JOHNSON, OF MAYWOOD, ILLINOIS, ASSIGNORS TO WM. WRIGLEY, JR. CO., OF CHICAGO, ILLINOIS, A CORPORATION OF WEST VIRGINIA.

MACHINE FOR APPLYING WRAPPED ARTICLES TO FOLDERS.

Application filed July 9, 1925. Serial No. 42,352.

*To all whom it may concern:*

Be it known that we, WILLET B. RANNEY and ARTHUR E. JOHNSON, both citizens of the United States, and residents of Chicago and Maywood, respectively, in the county of Cook and State of Illinois, have invented certain new and useful Improvements in Machines for Applying Wrapped Articles to Folders, of which the following is a specification.

This invention relates to a machine for applying wrapped articles to suitable cards or folders, as a means for conveniently distributing samples of the articles, such as sticks of gum, together with appropriate descriptive or advertising matter.

A preferred construction of the machine embodying the invention is disclosed in the accompanying drawings, in which:

Figure 1 is a general view in vertical section as taken on line 1—1 of Figure 2, which may be regarded as a view in front elevation of the feeding and driving mechanisms;

Figure 2 is a view in vertical section taken on line 2—2 of Figure 1, and showing the feeding and driving mechanisms in side elevation;

Figure 3 is a top plan view of the machine with portions of the magazines shown in section as taken on line 3—3 of Figure 1;

Figure 4 is an enlarged detail view in vertical section taken on line 4—4 of Figure 3, showing the position of the card feeding devices at the commencement of a feeding operation;

Figure 5 is a view corresponding to Figure 4, but showing the parts in an advanced position;

Figure 6 is a view corresponding to Figure 5, but taken on line 6—6 of Figure 1;

Figure 7 is a perspective view of one of the cards or folders showing the arrangement of tongues on which the samples are threaded;

Figure 8 is a perspective view of a package in stick form and adapted to be applied to the longer tongues of the card;

Figure 9 is a perspective view of a package in lozenge form and adapted to be threaded on to the shorter tongue of the card;

Figure 10 is an enlarged detail view in vertical section taken on line 10—10 of Figure 6;

Figure 11 is an enlarged detail view in vertical section taken on line 11—11 of Figure 13;

Figure 12 is a perspective view showing the position of the package carrier plate and card feeding device immediately after a card has been discharged from the machine;

Figure 13 is a perspective view showing the package carrier plate in advanced position and showing a card being fed forwardly to pick up the packages from the carrier plate;

Figure 14 is an enlarged detail view in vertical section taken on line 14—14 of Figure 3, showing the means for holding the packages in their magazines during the forward and return strokes of the package carrier plate; and Figure 15 is a detailed view in vertical section taken on line 15—15 of Figure 14.

The machine comprises in general a frame having the general construction of a table and consisting of a top plate or platform 1, supported on vertical uprights or legs 2—2. On the platform or table 1, is supported the feeding devices, consisting of means for advancing successive cards toward and at right angles to a reciprocating carrier plate onto which the packages are fed by gravity from magazines at the end of each return stroke and thence carried forwardly into the path of the advancing cards.

Beneath the platform 1 is mounted the driving mechanism, driven by a motor 3, the principal elements being two shafts 4 and 5, extending at right angles to each other and carrying a number of cam disks and sprocket wheels, which in turn actuate the different parts of the mechanism above the table, through oscillating levers and sprocket chains, depending on whether reciprocating or rotary motion is required. The shaft 4 is driven from the motor 3 through a counter-shaft 6, from a loose pulley 7, turning on the shaft 4, and directly driven by a belt 8, from the motor. The loose pulley drives the counter-shaft 6 through a belt 9, and in turn drives the shaft 4 by a sprocket chain 10. The shaft 5 is driven from the shaft 4 by mitre gears 4ª and 5ª, on their respective shafts 4 and 5.

The various driving members will be identified in connection with the parts operated thereby, it being understood that the use of properly designed cams, oscillating levers, and connecting links are common expedients for imparting reciprocating movement to machine parts, and that gearing or sprocket chains carried by rotative shafts are the common means for imparting rotary motion.

In describing the mechanism supported upon the top plate 1 of the machine frame, and which constitutes the novel features of the invention, it may be explained generally that at one corner of the top 1 is located a card magazine C, in which a stack of cards or folders A are piled, these cards being preferably of a relatively stiff grade of cardboard substantially square in shape and adapted to be folded double along a score-line $a$. On one side of the score-line and occupying one-half of the card is a series of tongues arranged transversely of the card and formed by cutting the tongues from the material of the card in a suitable cutting machine. As shown in Figure 7, the tongues are four in number, three of them $b$, of the same length, and the fourth $b'$ being somewhat shorter. All of the tongues have pointed ends, directed toward the adjacent edge of the card, which is the forward edge as the card is fed through the machine.

As clearly shown in Figures 2 and 4, the card magazine C consists of an upright receptacle of skeleton form in which the cards, in the form shown in Figure 7, are piled, the supply of these cards being replenished from time to time as the pile diminishes. Immediately forward of the card magazine C is a series of feed rolls 11 disposed one above the other in the plane of the cards advanced from the magazine C. Immediately beyond the feed rolls is the reciprocating carrier plate 12, moving forwardly and rearwardly immediately in front of the rolls and at right angles to the direction to which the cards are advanced. The carrier plate slides in a suitable guide-way formed in a fixed plate 13, which for convenience may be considered as an extension to the card magazine C and a support for the card feeding mechanism hereinafter to be described.

At one side of the feed rolls and to the left of the line of the advancing cards is a series of four vertical magazines D, arranged in a row across and just above the carrier plate.

In order that a general idea may be obtained of the operation of the machine, it may be stated that the cards A are successively fed from the card magazine C toward and between the feed rolls 11, whereupon the several tongues $b$ and $b'$ are depressed, by means presently to be described, so that their pointed ends are in readiness to pass between the wrappers of the sticks of gum, which in the meantime have been deposited on the carrier plate during its return stroke and brought forward, coming to rest momentarily in line with the advancing card so that as the latter continues its forward movement the points of the tongues are threaded through the space between the wrapper and the top side of the stock and carried on with the card as it is discharged from the machine.

With this general explanation of the sequence of events a more detailed description of the various mechanisms will now be undertaken, beginning with the means for advancing the cards successively from the card magazine and toward the feed rollers.

As clearly shown in Figures 2, 3 and 4, the cards A, piled in the magazine C, are supported just above a reciprocating feed bar 14 moving toward and from the feed rolls 11 beneath the magazine, said feed bar carrying a spring plate 14ª consisting of a sheet of material having a pair of upturned card engaging fingers 14ᵇ at its rear edge and positioned to be pressed upwardly against the pile of cards. The reciprocating feed bar is connected with a depending L-shaped arm 15, which in turn is connected with a downwardly extending arm 16, passing through a slot in the top plate 1 and pivotally connected at its lower end with a substantially horizontal link 17. Connected with the opposite end of the link is a lever 18, pivoted at its lower end on a suitable bracket 19, mounted on a cross-bar 20, near the lower part of the frame. The lever 18 is actuated by a cam disc 21, keyed to the shaft 5, said disc having a suitable cam groove in its face in which rides a cam roller 18ª journalled on the side of the lever 18, intermediate its ends. The groove in the cam disc is manifestly shaped to transmit an oscillatory movement to the lever 18, which in turn transmits a reciprocating movement to the feed bar 14 with a predetermined length of stroke and speed, and at the proper intervals.

Associated with the reciprocating card feeding mechanism just described, is an auxiliary feeding device in the form of a plurality of reciprocating pusher fingers 22, lying below and forwardly of the feed bar 14, and extending beyond the magazine C to the feed rolls 11. The rear ends of the pusher fingers are integrally connected with a cross-bar 22ª, connected with a depending arm 22$^b$ passing downwardly through the top plate 1 and connected at its lower end with a link 23, which in turn is connected with a lever 24 pivotally mounted at its lower end on a bracket 25 fixed to the same bar 20 which supports the feed bar actuating the lever 18. This lever 24 is actuated by another cam disc 26, likewise mounted on the shaft 5, and immediately adjacent the cam disc 21, the same arrangement of groove and roller being used. It follows then that the pusher fingers 22 are actuated with a reciprocating movement, but with a shorter stroke and at a different interval than the card feeding device. As shown in Figures 3 and 4, the forward ends of the pusher fingers 22 slide in grooves formed in the plate 13, and are four in number, spaced apart at equal intervals. Moreover there is one pusher finger between each pair of feed rolls 11, and, as will hereafter appear, there is a finger in line with and just below each of the tongues of the card and opposite the end of a package during the operation of threading the packages onto the tongues. It will be noted that the top edges of the pusher fingers lie in the plane of the advancing card and form the supports on which the cards slide in passing from the magazine to the feed rolls, there being located just above the forward ends of the fingers and just behind the feed rolls a corresponding number of guide bars 27, terminating in pointed horns 27$^a$ at their forward ends and forming with the top edges of the pusher fingers guide slots 28 for the cards. These upper guide bars are secured to the under side of a transverse supporting bar 29, fixed to side plates 30, extending along either side of the path of the cards, and serve to guide them from the magazine C (Figure 3).

These pusher fingers, together with their operating mechanism, as will hereinafter be pointed out, act to insure the discharge of the sticks of gum from the carrier plate 12, in the event that the supply of cards should become exhausted and hence no card be fed forwardly to receive the sticks. Manifestly, the purpose of the ejecting device is to prevent the machine from becoming jammed, as would otherwise result should the card feeding mechanism fail to function.

Referring now to the feed rolls 11, it will be noted that they are arranged in pairs, one above and one below the path of the cards, there being five pairs shown. The rolls are fixed to upper and lower shafts 11$^a$, 11$^b$, and spaced apart at equal intervals there-along. The shafts 11$^a$ and 11$^b$ are journalled at their ends in two side frame members 31, 31, extending across and over the path of the carrier plate and supporting at their forward ends a similar set of rolls 32, which discharge the loaded cards from the machine. This outer set of rolls is fixed to shafts 32$^a$ and 32$^b$ and is otherwise exactly like the feed rolls, and is driven in unison therewith and from the same source of power. Thus each pair of shafts 11$^a$, 11$^b$, and 32$^a$, 32$^b$, carry at their adjacent ends intermeshing pairs of gear wheels 33, 33, and 34, 34, respectively, the lower gear wheels also meshing with a single large gear wheel 35, so that all rolls turn together at the same speed. The drive for the rolls consists of a sprocket chain 36, engaging a sprocket wheel 36$^a$, mounted at the end of the lower feed roll shaft 11$^b$ and a large sprocket wheel 37, mounted on the shaft 5 below the top plate 1.

Considering the action of the card feeding mechanism, Figure 4 shows the parts at the beginning of the forward stroke of the feed bar 14, it being observed that the same is fully retracted and the fingers 14$^b$ of the plate 14$^a$ are just rearwardly of the card magazine C. Figure 5 shows the feed bar shifted forwardly carrying the foremost card A horizontally forward through a slot at the lower front edge of the magazine, the distance of travel of the feed bar being such that the forward edge of the card is carried between the sets of feed rolls 11, at which point the slide bar is retracted to its original position ready to advance the next card. The card, thus engaged by the feed rolls, continues its advance movement between the rolls and to the edge of the carrier plate 12, which in the meantime has been advancing forwardly and at right angles to the path of the card, with a load of wrapped sticks to be applied to the card.

Before describing the action of the carrier plate and the operation of threading the tongues through the wrappers of the sticks, the method of preparing the tongues will be consider first.

Referring again to the guide plates 27, it was explained that the tapered ends or horns 27$^a$ projected forwardly between the upper feed rolls 11, parallel with the direction of the movement of the advancing cards (Figures 12 and 13), and, as appears from Figure 13, these horns or points are directly in line with the several tongues $b$ and $b'$ of the card as it passes beneath them. Secured to the transverse supporting bar 29, lying along the concave top edge of each horn 27$^a$ is a spring finger 38, secured by a screw 39, and projected at its free end just beyond the ends of the horns in an upturned end 38$^a$ for yielding contact with the tongues of the card as shown in Figure 13. Cooperating with the horns and spring fingers 38 are a series of short beveled ribs 39, along the edge of the carrier plate guide-way, there being one of these ribs immediately forward and in line with the upper feed rolls 11. Each rib is tapered upwardly from the surface of the plate 13, with which they are integral, so that as the card passes the feed rolls and rides upon these ribs, the main body of the card is slightly elevated, leaving the tongues in horizontal position and inclined downwardly with respect to the surrounding portion of the card, and under the pressure of the spring fingers 38. This action (as clearly shown in Figures 10 and 13) serves to depress the tongues and permit the body of the card to ride over the packages as the tongues are threaded through the wrappers.

Leaving the card in the position shown in Figure 13 for the moment, the action of the carrier plate will now be described. As already pointed out, this carrier plate 12 is mounted for endwise sliding movement in a suitable depressed guide-way or slot formed in the fixed base plate 13 and moves back and forth from the magazines D to a loading position in the path of the cards. The forward end of the carrier plate is provided with a longitudinal slot 12$^a$, and extending transversely of its top surface are a series of four slots 40 and 41, the first three 40, being of a width and depth to receive a stick of gum B with its wrapper (as shown in Figure 8) and which lies the full width of the plate, whereas the single slot 41 is only one-half the length of the slots 40, but is somewhat deeper to receive a lozenge shaped package B' (shown in Figure 9). The three slots 40 are adapted to receive their supply from the three similar magazines D, whereas the groove 41 receives its supply from the magazine D' (Figure 3), said magazines conforming to the shape of their contents, which are piled in vertical stacks therein. Thus assuming that the carrier plate 12 is retracted to the position shown in Figure 3, a stick of gum or wrapped package is released from each of the magazines and deposited in each of the transverse slots in the face of the carrier plate. Manifestly means for holding the gum within the magazines and for releasing same at the proper moment is required and such will hereinafter be described. For the time being, however, it may be assumed that the carrier plate receives a package from each magazine in its proper slot and starts its forward movement, coming to rest momentarily with the three flat packages B in line with the tongues $b$ of the card and the lozenge shaped package in line with the short tongue $b'$. Thus, referring again to Figure 13, it will be seen that the packages B and B' are brought forward and in position to engage the tongues $b$ and $b'$, this being accomplished by the pointed ends of the tongues passing underneath the adjacent ends of the wrappers and being threaded there-through until they are fully inserted, whereupon the gum is picked up by the card as it continues its advance movement, between the feed rolls and thence to the discharge rolls, which discharge the loaded card from the machine to make way for the next card which is following just behind. The carrier plate having been delivered of its load is retracted and receives another load from the magazines, and immediately comes forward again for the next card.

As shown in Figures 1, 2 and 3, the carrier plate 12 is actuated by mechanism located beneath the table top 1, consisting of a reciprocating bar 42, slidably mounted just beneath the top plate 1 and parallel with the carrier plate, one end of the bar extending beyond the machine frame and connected with the rear end of the carrier plate by a curved connecting bar 43, said bar 43 preferably having hinged connection with the sliding bar 42. Sliding bar 42 has operative connection with a vertically arranged lever 44, through the medium of a short link 45 and a collar 46 on the bar 42. The lower end of the lever 44 is journalled in a suitable bracket 47 fixed to the frame and driven by a cam disc 48, mounted on the shaft 4. The cam disc 48 is provided with a groove 48$^a$ engaged by a cam roller 44$^a$ carried by the lever 44, thus imparting thereto an oscillating movement, which in turn transmits reciprocating movement to the sliding bar 42, and thence to the carrier plate 12.

There are several auxiliary devices or appliances which function during the operation of threading the sticks onto the tongues, which are necessary in order that these operations may proceed smoothly and with certainty.

These devices will be considered in order. In the first place, it is necessary to hold the sticks of gum B in the carrier and against endwise movement while the tongues are passing beneath the wrappers; Figure 4 discloses the means for accomplishing this result. At the edge of the guide-way on which the carrier plate slides and extending upwardly along the path of the carrier plate 12 is a series of hinged stop fingers 49, each normally standing upright with their upper ends just opposite one of the slots 40 of the carrier plate and containing the packages B. Just below the upper end of each of these stop fingers is a pin 49$^a$, normally engaged by the forwardly projecting end of a trip block 50, pivoted on a pin 50$^a$ immediately behind the stop pin 49$^a$. Projecting upwardly from the block 50 is a dog 51, normally lying in the path of the advancing card. A small spring 52 is connected with the block 50 below the pivot pin 50$^a$ and with a fixed part of the machine, so that it acts to hold the dog 51 in upright position and to swing it back into that position after it has operated. Thus, assuming that a card is advancing over the carrier plate, the packages B are held against endwise movement while the tongues of the card are being threaded there-through, as the forward edge of the card passes beyond the carrier plate, it strikes the upstanding dog 51, swinging it backwardly and below the card, thus releasing the stop finger 49, which also drops backward and below the card, permitting the package to move onward with the card. Manifestly, the stop fingers are so adjusted that they hold the sticks against movement just long enough to allow them to be fully threaded onto the tongues, and then by tripping of the dogs 51 these stop fingers drop away allowing the sticks to proceed. As soon as the card has passed over the dog 51, it is released and brought back into normal position by the action of the spring 52, carrying with it the stop finger 49. Thus this action is repeated for every loading operation and for each of the packages B.

In the case of the shorter packages B', a somewhat more complicated mechanism is used for momentarily holding them in position, owing to their shorter length. Thus, as shown in Figures 6 and 12, a plate 53 is hinged at one edge in a recessed block 54 opposite the end of the slot 41, and below the bottom thereof, said block being clear of the carrier plate since it is located in line with the slot 12ª thereof, as shown in Figure 12. Passing upwardly through a vertical slot 55 in the block and just forwardly of the hinged edge of the plate 53 is a vertical trip bar 56 extending downwardly a short distance below the top plate 1 of the machine and connected with a horizontal rocker arm 57 (Figure 1), pivotally mounted intermediate its ends at 58 and acted on by a coil spring 59 which normally acts to hold the trip bar in elevated position so that it holds the hinged plate 53 in raised position opposite the forward end of the package B', as shown in Figure 13. At the opposite end of the rocker arm 57 is a cam roller 60, riding on the periphery of the cam disc 48, which actuates the carrier plate, said disc having a cam member 61, which trips the rocker arm 57, at the proper instant in each revolution, namely, immediately after the package B' has been threaded on its tongue b', and the card A is about to continue its advancing movement. Thus, as clearly shown in Figures 6 and 13, the trip bar is normally lifted so as to hold the plate 53 in upright position to act as a stop for the package, and at the proper time is depressed so that the plate may drop to permit the package to slide over it.

Furthermore, by reason of the relatively short length of the package B', it is preferable to apply adhesive to the under side of the tongues b' immediately before they are threaded through the wrappers of the packages B', so as to insure their more secure mounting. For this purpose use is made of a small glue roller 62 (Figure 6) mounted upon a small glue pot 63, the latter in turn being supported at the upper end of a vertically movable arm 64 extending downwardly through a slot in the top plate 1 and connected midway between the ends of a long horizontal lever 65, pivotally mounted at the forward end of the machine frame on a bracket 66 and resting at its free end on a transverse frame member 67 at the rear end of the machine, and through the medium of an adjusting screw 68. In normal position the lever 65, which also serves as the supporting member of the glue pot, rests in lowered position and is elevated at intervals through the medium of a cam 69 (Figure 1) on the periphery of the cam wheel 48, and which engages a cam roller 70, mounted on an arm 65ª extending downwardly near the free end of the lever 65. Thus, with each revolution of the cam disc 48 the arm 65ª is momentarily raised, carrying the glue roller 62 upwardly so that it comes in contact with the under side of the short tongue b' of each card A. In this way the adhesive serves to more securely attach the small packages B'.

As heretofore pointed out, means are required for retaining the pile of sticks in their magazines D during the forward and rearward strokes of the carrier plate, but which will be actuated at the proper time to permit the sticks to drop into their respective slots in the carrier plate when the latter has been retracted to the position to receive them. Thus, as shown in Figures 14 and 15, and more generally in Figure 3, there is mounted below the carrier plate a loosely hinged bar 71, having a flattened end portion 71ª extending lengthwise of the carrier plate beneath the magazine D and within the longitudinal slot of said carrier plate. This flat bar 71ª is connected at its rear end with a narrow neck portion 71ᵇ curved downwardly and rearwardly and loosely hinged at a fixed point of the machine underneath the carrier plate by means of a screw 72. Immediately below the bar 71ª is a sliding cam 73, adapted to slide endwise and in a suitable guide-way below the carrier plate 12. The cam 73 consists of two parallel bars 73ª, 73ª, arranged edgewise and connected together by suitable cross-members 73ᵇ (Figure 15). Near the rear ends of the bars 73ª are cam surfaces 74, 74, adapted to engage the under side of the bars 73ª, adjacent their side edges. In the position shown in Figure 14, the cams 74 are beneath the rear ends of the bar 71ª, and straddle the neck portion 71ᵇ thereof, thus lifting the bars 71ª upwardly against the bottom of the magazines and preventing the packages B from dropping onto the carrier plate below. Assuming, therefore, that the carrier plate is approaching the end of its return stroke in Figure 14, and about to receive a load of packages from the magazines, it will be seen that the bar 71 is held in elevated position by the cams 74, 74. At the forward end of the carrier plate is a transverse depending flange 75, which engages the forward end of the bar 73, shifting it rearwardly a short distance, sufficient to displace the cams 74, 74, from beneath the bar 71, permitting the same to drop downwardly and releasing the contents of the magazines to fill their respective slots in the carrier plate. As the carrier plate moves forwardly, the bar 71 remains depressed until it has been cleared by the packages being advanced with the carrier, whereupon the rear end of the cam bar 73 is engaged by the rear end of the slot 12$^a$ of the carrier plate, shifting it forward a distance sufficient to cause the bar 71 to ride up on the cams 74, 74, and be lifted into position to hold the contents of the magazines above and out of contact with the carrier plate, until the same has returned and the proper slot been brought under its magazine. Otherwise it would follow that the contents of the first magazine D would drop into the first slot on the return stroke, instead of the last slot, and so on, or in the reverse order in which they should be fed to the carrier.

The action of the ejector device still remains to be described. The ejector consists of the reciprocating pusher fingers 22, extending beneath the cards as they pass between the feed rolls 11, and terminating at the guide-way for the carrier plate 12, when in fully retracted position, as shown in Figures 4, 10 and 12. These fingers operate when the tongues of the cards have been inserted through the wrapper of the packages, and simultaneously with the forward movement of said packages with the card, the same being advanced forwardly immediately behind the packages as they slide endwise from the slots on the carrier plate. Thus, the fingers travel the full width of the carrier plate and are then retracted during the period that the carrier plate is at rest at the end of its forward stroke. It is to be noted that these pusher fingers perform no function when the cards are being properly fed through the machine and the packages are properly applied to the tongues. But, as hereinbefore pointed out, they serve to prevent jamming of the machine should the cards fail to be advanced properly, or should the supply of cards become exhausted through oversight on the part of the operator, or should any of the packages for any reason not be threaded on the tongues of the card, since, in which case the pusher fingers would then engage the packages and discharge them from the carrier plate, thus freeing it for the next stroke or cycle of operation.

Having thus described the construction and operation of the machine embodying the invention, we claim as our invention:

1. A machine of the character described, comprising means for feeding cards, provided with a package engaging tongue, along a predetermined path through the machine, and means for feeding wrapped packages into the path of said cards where the packages are attached to the cards by the passage of said tongues through said wrappers.

2. A machine of the character described, comprising means for feeding cards, provided with a package engaging tongue, toward a predetermined point of said machine, means for feeding wrapped packages toward said point and in position to engage the tongue of each card, whereby said packages are attached to said card by the passage of said tongues through said wrappers, in the relative movement of said cards and packages.

3. A machine of the character described comprising means for advancing successive cards in a predetermined path through the machine, means for advancing wrapped packages into the path of said cards, said cards being provided with members for picking up the packages during the advancing movement of said cards.

4. A machine of the character described comprising means for advancing successive cards from one direction toward a predetermined point of said machine, means for advancing successive wrapped packages from another direction toward said point, and means for attaching the packages to said cards in the movement of one in contact with the other at said point.

5. A machine of the character described comprising means for advancing successive cards with a continuous movement through said machine, means for delivering successive packages into the path of the advancing cards, said cards being provided with a package engaging member whereby said packages are attached to the face of said cards in the relative movement of said packages and cards.

6. A machine of the character described comprising means for advancing successive cards with a continuous movement through said machine, means for delivering successive packages into the path of the advancing cards, said cards being provided with package engaging tongues whereby said packages are attached to said cards in their movement through the machine.

7. A machine of the character described comprising card feeding mechanism, means for guiding successive cards along a predetermined path through said machine, package feeding means acting to deliver wrapped packages in position to engage the face of said cards, the same being provided with members adapted to be inserted beneath the wrappers of said packages in the relative movement of said cards.

8. A machine of the character described comprising card feeding mechanism, means for guiding successive cards along a predetermined path through said machine, package feeding means acting to deliver packages into the path of said cards, said cards being provided with package engaging members acting to remove said packages from said package feeding means.

9. A machine of the character described comprising feeding means for advancing cards successively through said machine, means for feeding successive packages into the path of said cards, said cards being provided with package engaging members, and means located in the path of said cards for offsetting said package engaging members from the body of the card to engage said packages.

10. A machine of the character described comprising feeding means for advancing cards successively through said machine, a package carrier moving to and from a position in the path of said cards, means for feeding successive packages onto said carrier, said cards being provided with package engaging members, and means for distorting said cards to position said package engaging members to engage said packages.

11. A machine of the character described comprising means for feeding successive cards through said machine, means for feeding wrapped packages successively into the path of said cards, the same being provided with tongues adapted to engage the wrappers of said packages, and means cooperating with said carrier to hold said packages against movement during the passage of said tongues through the wrappers of said packages.

12. A machine of the character described comprising card feeding mechanism, means for guiding said cards successively through said machine, a package carrier operative to deliver successive packages into the path of said cards, the same being provided with tongues adapted to engage the wrappers of said packages, and means cooperating with said carrier to hold said packages against movement during the passage of said tongues through the wrappers of said packages.

13. A machine of the character described comprising card feeding mechanism, means for guiding said cards successively through said machine, a package carrier operative to deliver successive packages into the path of said cards, the same being provided with tongues adapted to engage the wrappers of said packages, means for offsetting said tongues from the plane of said cards to engage said packages, and means for holding said packages against movement on said carrier as said tongues are engaging said packages.

14. A machine of the character described comprising card feeding mechanism, means for guiding cards successively through said machine, means for delivering successive packages into the path of said cards, the same being provided with tongues adapted to engage the wrappers of said packages, means for holding said packages against movement during the engagement of said wrappers by said tongues, and means actuated by the card for tripping said package holding means to permit said packages to advance with said cards.

15. A machine of the character described comprising card feeding mechanism, means for guiding said cards successively through said machine, a package carrier operative to deliver successive packages into the path of said cards, the same being provided with tongues adapted to engage the wrappers of said packages, means located in the path of said cards and adapted to depress said tongues below the plane of the card body to engage the wrappers of said packages, means for holding said packages against movement during the engagement of said wrappers by said tongues, and means actuated by the card for tripping said package holding means to permit said packages to advance with said card.

16. A machine of the character described comprising means for feeding successive cards edgewise through the machine, said cards being provided with tongues directed forwardly, means for feeding wrapped packages into the path of said cards and in line with the tongues thereof, and means for offsetting said tongues from the body of said cards, whereby said tongues engage the wrappers of said packages in the forward movement of the cards.

17. A machine of the character described comprising a card magazine, means for feeding successive cards from said magazine, said cards being provided with tongues, means for advancing said cards edgewise with the free ends of said tongues directed forwardly, means for feeding wrapped packages into the path of said cards with their ends in line with the tongues thereof, and means for distorting the card whereby the body thereof passes above the packages and said tongues pass beneath the wrappers of said packages.

18. A machine of the character described comprising means for feeding cards successively and continuously through said machine, said cards being provided with tongues with their ends extended forwardly, a reciprocating carrier, means for feeding wrapped packages onto said carrier for advancement into the plane of said cards, and members in the path of said cards acting to elevate the body thereof, whereby the tongues are relatively depressed to engage the wrappers of said packages.

19. A machine of the character described comprising means for feeding cards successively and continuously through said machine, said cards being provided with tongues with their ends extended forwardly, a reciprocating carrier, means for feeding wrapped packages onto said carrier for advancement into the plane of said cards, and members in the path of said cards acting to elevate the body and to depress the tongues thereof to engage the wrappers of said packages as said cards pass over the same.

20. A machine of the character described comprising a reciprocating card feeding mechanism for advancing successive cards through said machine, a reciprocating carrier plate movable transversely of the path of said cards, and provided with a transverse slot adapted to receive wrapped packages in one position and to advance the same into the path of the advancing cards, the same being provided with members acting to pick up said packages in the passage of said cards over said carrier plate in its advanced position.

21. A machine of the character described comprising a card magazine, a reciprocating card feeding member for advancing successive cards from said magazine, feed rolls in advance of said feeding member, a reciprocating carrier plate in advance of said feed rolls and movable transversely of the path of said cards, a package magazine above said carrier plate, the same being provided with a transverse slot adapted to receive the packages from said magazine, whereby said packages are positioned endwise toward the advancing cards, and means for attaching the packages to said cards in their passage over said plate in its advanced position.

22. A machine of the character described comprising means for advancing successive cards through said machine in a horizontal plane, said cards being provided with tongues cut in the body thereof with the free ends directed forwardly, means for feeding wrapped packages with their ends in line with the tongues of said cards, and fixed members engaging said cards for depressing said tongues, whereby the same are threaded through the wrappers of said packages in the movement of said cards lengthwise of said packages.

23. A machine of the character described comprising means for advancing successive cards through said machine in a horizontal plane, said cards being provided with tongues cut in the body thereof with the free ends directed forwardly, a reciprocating carrier plate moving at right angles to the direction of movement of said cards and acting to advance wrapped packages into the path of said cards with their ends in line with the tongues thereof, and spring fingers bearing on said tongues to depress the same for threading through the wrappers of said packages.

24. A machine of the character described comprising means for advancing successive cards through said machine in a horizontal plane, said cards being provided with tongues cut in the body thereof with the free ends directed forwardly, means for feeding wrapped packages with their ends in line with the tongues of said cards, fingers arranged in the path of said cards and adapted to depress the same, and means for elevating the body of the card to pass over said packages as said tongues are threaded through the wrappers thereof.

25. A machine of the character described comprising a card guide slot, card feeding means comprising feed rolls above and below said guide slot, a reciprocating package carrier plate, adapted to feed successive packages in line with said guide slot, said cards being provided with package engaging members acting to remove said packages from said carrier in the advancing movement of said cards, and ejector mechanism cooperating with said card feeding means and comprising a reciprocating finger adapted to move behind said package in its movement from said carrier plate.

26. A machine of the character described comprising reciprocating card feeding mechanism, a reciprocating package carrier plate provided with a transverse slot, means for feeding successive packages into said slot to be advanced into the path of said cards, the same being provided with package engaging members acting to pick up said packages from said carrier in the movement of said cards, and ejector mechanism cooperating with said card feeding means and comprising a reciprocating finger adapted to advance lengthwise of said slot and normally moving behind said packages when engaged by said card, but acting in the event of failure of the packages to be picked up, to eject the same from the carrier plate.

27. In a machine of the character described, the combination with cards provided with tongues cut from the body thereof, and wrapped packages adapted to be threaded onto said tongues, of means for advancing the cards with the ends of the tongues directed forwardly, and means for feeding the packages into the path of said tongues, whereby the same are picked up by the tongues in the movement of the cards through the machine.

28. In a machine of the character described comprising a series of package magazines, a reciprocating carrier plate below said magazines, and provided with recesses adapted to register with each of said magazines in one position of said plate, means for releasing the packages successively from said magazines, means for feeding cards provided with package engaging tongues over said carrier in another position thereof, and means for guiding the tongues of said cards through the wrapper of said packages.

29. In a machine of the character described comprising means for advancing successive cards through the machine, including a guide slot, means for feeding packages into the path of said cards, and means for attaching the packages to the face of said card as they advance through the machine, comprising a tongue cut from the body of the card and a glue roller mounted adjacent the path of said cards, and means for intermittently moving said roller into and out of contact with the surface of said tongue.

30. In a machine of the character described the combination with cards provided with tongues cut from the body thereof, and wrapped packages adapted to be threaded onto said tongues, of means for advancing the cards with the ends of the tongues directed forwardly, and means for feeding the packages into the path of said tongues, whereby in the relative movement of said cards and packages the latter are picked up by the passage of the tongues lengthwise between the wrapper and contents of the package.

In witness whereof, we hereunto subscribe our names this 3rd day of July A. D. 1925.

WILLET B. RANNEY.
ARTHUR E. JOHNSON.